United States Patent Office 3,437,472
Patented Apr. 8, 1969

3,437,472
ALGAECIDE AND PROCESS OF MAKING
THE SAME
Fay E. Marshall, Atherton, Calif., assignor to Mellcor
Corporation, a corporation of California
No Drawing. Filed Sept. 18, 1963, Ser. No. 309,892
Int. Cl. A01n 11/06
U.S. Cl. 71—67     3 Claims

ABSTRACT OF THE DISCLOSURE

An algaecide containing a colloidally dispersed phase of sulphur in a continuous aqueous phase.

---

The present invention relates to improvements in an algaecide and process of making the same. It consists of the ingredients of the composition of matter and the steps of the process as hereinafter described and claimed.

It is proposed in this invention to provide an algaecide that may be used in various pools of water, for instance, swimming pools, to eliminate the harmful red, green, black and brown microorganisms which discolor water and harm swimming pool fabrics. It will be understood, of course, that any type of pool of water may be treated chemically with the algaecide to destroy the algae.

It has been found that algae cannot live in water containing sulphur in a colloidal form. The process of making the algaecide will be set forth first and then the ingredients of the composition of matter will be described.

In making this colloid in a water base, the steps are set forth as follows:

(1) Mix 3 to 4 liters of water ($H_2O$) with 3 to 4 liters of kelp residue (4 to 5 kilograms ocean kelp peeled and boiled in 40 to 50 liters of water for about 3 hours, then cool and filter) and using only the liquid part of the filtrate;

(2) Add 1 to 1½ kilograms of flowers of sulphur (S);

(3) Add 1 to 1½ kilograms bicarbonate of soda ($NaHCO_3$);

(4) Add 1 to 1½ kilograms calcium carbonate ($CaCo_3$);

(5) Boil until a red liquid is formed (approximately 3 hours), cool and filter and using only the filtrate;

(6) Add 700 to 800 grams of sodium hydroxide (NaOH) flakes;

(7) Boil for about 30 minutes, filter and use filtrate as a base for colloidal substance.

These proportions that have been found are critical in this range. The addition of too much or too little water or kelp residue will lengthen the boiling time and weaken the resulting base. A larger amount of sulphur results in a darker color and poorer resulting colloid. Less sulphur results in a lighter color and the same deficient results.

Adding more or less of the other ingredients results in cloudy filtrates which form particles too large to form a colloid.

The addition of more sodium hydroxide causes the resulting base to become too caustic and the resulting colloid will be too thinly dispersed in the salt base. If less is used the supernatant will not be able to keep the colloid in suspension and the existing sulphur will not go into colloidal solution.

In using the base dissolve 90 to 120 milliliters of this base in sufficient water ($H_2O$) to make 3.5 to 4 liters of liquid, and add 20 to 30 milliliters of hydrochloric acid (HCl) to form a colloid.

If the acid is added dropwise and mixed carefully the resulting sulphur dioxide gas ($SO_2$) that is released goes off and leaves a comparatively odorless liquid with a milky appearance. If left to settle a purely colloidal liquid may be siphoned off of the larger particles of white sulphur that is formed. This cloudy white liquid may be made into a pleasant perfumed liquid by adding a synthetic perfume base dissolved in alcohol by the drop (about 6 to 7 drops per 60 to 70 milliliters).

This makes a very good algaecide which is within 6.5 and 7.5 pH and is harmless to skin, eyes, etc., and also harmless to all swimming pool fabrics and fixtures, including plumbing and filters.

As to the ingredients remaining in the final composition of matter comprising the algaecide, they comprise:

(a) free sulphur (S);
(b) sodium sulphate ($Na_2SO_4$);
(c) sodium sulphide ($Na_2SO_3$);
(d) sodium chloride (NaCl);
(e) potassium chloride (KCl); and
(f) water base ($H_2O$).

Sulphur dioxide ($SO_2$) is released when the acid is added, and carbon dioxide ($CO_2$) is boiled off in the boiling process.

The resulting compound is sulphur in colloidal suspension in a salt solution consisting of: sulphur and various sulphates, sulphites, sodium chloride and potassium salts (from the kelp).

I claim:
1. A process for making an algaecide colloidal liquid containing sulphur particles dispersed therein comprising the steps of (A) combining the following ingredients in the proportions and manner stated: (1) mixing 3 to 4 liters of water with 3 to 4 liters of kelp residue obtained by peeling and boiling 4 to 5 kilograms of ocean kelp in 40 to 50 liters of water for about 3 hours, then cooling and filtering and using only the liquid part of the filtrate; (2) adding 1 to 1½ kilograms flowers of sulphur; (3) adding 1 to 1½ kilograms bicarbonate of soda; (4) adding 1 to 1½ kilograms calcium carbonate; (5) boiling approximately 3 hours until a red liquid is formed, cooling and filtering and using only the filtrate; (6) adding 700 to 800 grams of sodium hydroxide flakes; (7) boiling for about 30 minutes, filtering and obtaining a filtrate as a base for colloidal substance; (B) dissolving 90 to 120 milliliters of this base in sufficient water to make 3.5 to 4 liters of liquid, and adding 20 to 30 milliliters of hydrochloric acid to form a colloid; (C) the acid being added dropwise and mixed carefully so that the resulting sulphur dioxide gas is released, leaving a comparatively odorless liquid with a milky appearance and (D) allowing this comparatively odorless liquid to settle so that a purely colloidal liquid may be separated from the larger particles of white sulphur that formed.

2. A process for making an algaecidal colloid comprising the steps of: (A) combining the following ingredients in the proportions and manner stated: (1) mixing 3 to 4 liters of water with 3 to 4 liters of kelp residue liquid filtrate obtained by peeling and boiling 4 to 5 kilograms of ocean kelp in 40 to 50 liters of water for about 3 hours, then cooling and filtering; (2) adding 1 to 1½ kilograms flowers of sulphur; (3) adding 1 to 1½ kilograms bicarbonate of soda; (4) adding 1 to 1½ kilograms calcium carbonate; (5) boiling approximately 3 hours until a red liquid is formed, cooling and filtering and using only the filtrate; (6) adding 700 to 800 grams of sodium hydroxide flakes; boiling for about 30 minutes, filtering and obtaining a filtrate as a base for colloidal substance; (B) dissolving 90 to 120 milliliters of this base in sufficient water to make 3.5 to 4 liters of liquid, and adding 20 to 30 milliliters of hydrochloric acid to form a colloid.

3. An algaecidal product formed according to the process of claim 2.

References Cited

UNITED STATES PATENTS

| | | | |
|---|---|---|---|
| 1,048,161 | 12/1912 | Hillyer | 167—20 |
| 1,550,650 | 8/1925 | Banks | 167—20 |
| 1,765,307 | 6/1930 | Howard | 167—20 |
| 868,566 | 10/1907 | Hughes | 167—14 |
| 971,799 | 10/1910 | Stevenson | 167—14 |

OTHER REFERENCES

Merck Index, 6th ed. (1960), page 963.

ALBERT T. MEYERS, *Primary Examiner.*

S. J. FRIEDMAN, *Assistant Examiner.*

U.S. Cl. X.R.

210—64; 424—162